(12) United States Patent
Yamada

(10) Patent No.: US 7,585,082 B2
(45) Date of Patent: Sep. 8, 2009

(54) MIRROR AND ANGLE DETECTION DEVICE

(75) Inventor: Ayako Yamada, Fujieda (JP)

(73) Assignee: Murakami Corporation, Shizuoka-shi (JP)

(*) Notice: Subject to any disclaimer, the term of this patent is extended or adjusted under 35 U.S.C. 154(b) by 352 days.

(21) Appl. No.: 11/230,570

(22) Filed: Sep. 21, 2005

(65) Prior Publication Data

US 2006/0066968 A1    Mar. 30, 2006

(30) Foreign Application Priority Data

Sep. 29, 2004    (JP)    ............... 2004-283435

(51) Int. Cl.
*G02B 5/08*    (2006.01)
*G02B 7/182*    (2006.01)
*B60R 1/06*    (2006.01)

(52) U.S. Cl. .................. 359/872; 359/874; 359/876; 359/877

(58) Field of Classification Search ............... 359/872, 359/874, 876, 877
See application file for complete search history.

(56) References Cited

U.S. PATENT DOCUMENTS

| | | | | |
|---|---|---|---|---|
| 3,576,359 | A * | 4/1971 | Cosh | ................ 359/877 |
| 4,151,757 | A * | 5/1979 | Pitrat | .............. 74/502.1 |
| 4,449,788 | A * | 5/1984 | Suzuki | ............. 359/873 |
| 4,504,117 | A | 3/1985 | Mittelhäuser | |
| 4,540,252 | A * | 9/1985 | Hayashi et al. | ........ 359/874 |
| 4,770,522 | A * | 9/1988 | Alten | .............. 359/873 |
| 4,906,089 | A * | 3/1990 | Biondi et al. | .......... 359/843 |
| 4,940,322 | A * | 7/1990 | Hamamoto et al. | ....... 359/873 |
| 5,993,018 | A * | 11/1999 | Hattori et al. | ........ 359/877 |
| 6,000,805 | A * | 12/1999 | Inagaki | ............. 359/871 |
| 6,087,953 | A * | 7/2000 | DeLine et al. | ......... 340/815.4 |
| 6,382,806 | B1 * | 5/2002 | Fuchs et al. | .......... 359/877 |
| 6,478,436 | B1 | 11/2002 | Jacobsen | |

(Continued)

FOREIGN PATENT DOCUMENTS

EP    0 895 898 A2    2/1999

(Continued)

OTHER PUBLICATIONS

U.S. Appl. No. 11/194,538, filed Aug. 2, 2005, Yamada.

(Continued)

*Primary Examiner*—Ricky D Shafer
(74) *Attorney, Agent, or Firm*—Oblon, Spivak, McClelland, Maier & Neustadt, P.C.

(57) ABSTRACT

Disclosed are a mirror and an angle detection device that detects an inclined angle of a mirror surface of the mirror. A mirror includes a mirror surface, an actuator for swiveling the mirror surface, at least one magnet for changing its orientation by an angle according to a variation in an inclined angle of the mirror surface, and at least one signal output unit for outputting a signal according to the inclined angle, based on the orientation of the magnet. An angle detection device that detects an inclined angle of a mirror surface of a mirror includes at least one magnet for changing its orientation by an angle according to a variation in the inclined angle of the mirror surface, and at least one signal output unit for outputting a signal according to the inclined angle, based on the orientation of the magnet.

12 Claims, 8 Drawing Sheets

U.S. PATENT DOCUMENTS

| | | | |
|---|---|---|---|
| 7,270,432 B2* | 9/2007 | Yamada et al. | 359/874 |
| 7,320,527 B2* | 1/2008 | Yamada et al. | 359/872 |
| 2006/0028745 A1* | 2/2006 | Yamada | 359/877 |
| 2007/0024966 A1* | 2/2007 | Yamazaki et al. | 359/385 |

FOREIGN PATENT DOCUMENTS

| | | |
|---|---|---|
| JP | 3-112441 | 11/1991 |
| WO | WO 00/05803 | 2/2000 |

OTHER PUBLICATIONS

U.S. Appl. No. 11/195,761, filed Aug. 3, 2005, Yamada et al.

* cited by examiner

FIG. 3
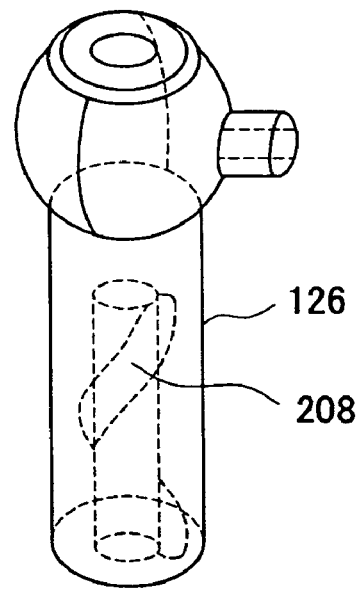
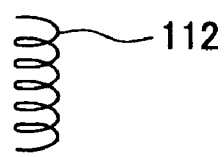
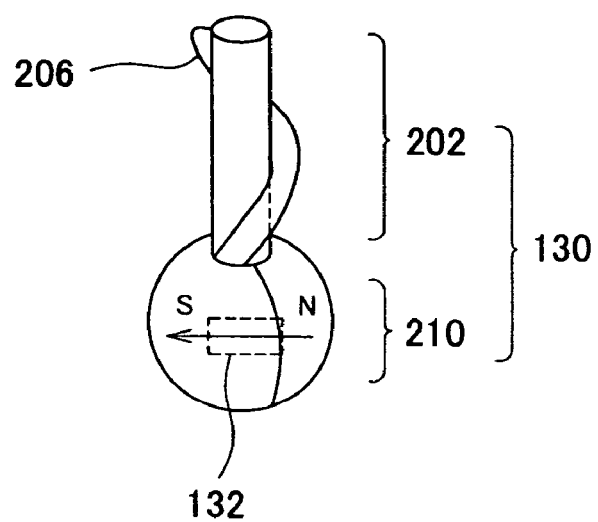

FIG. 4
(a)
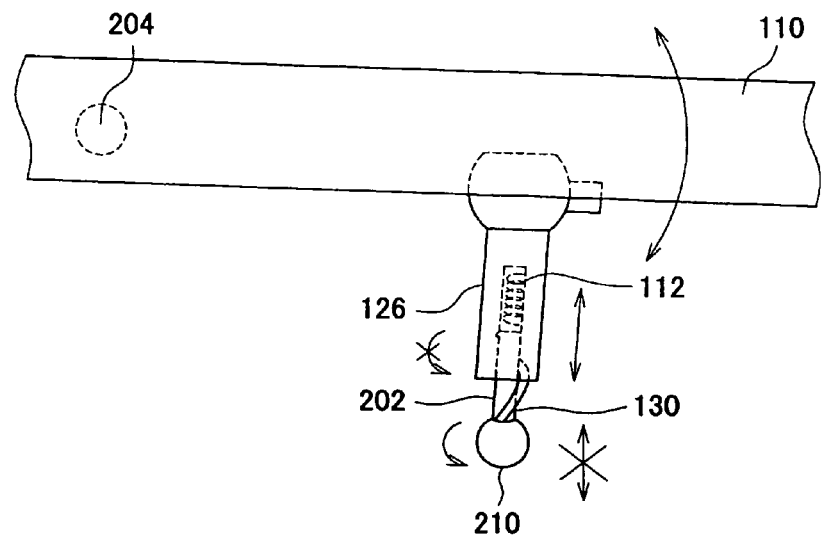
(b)
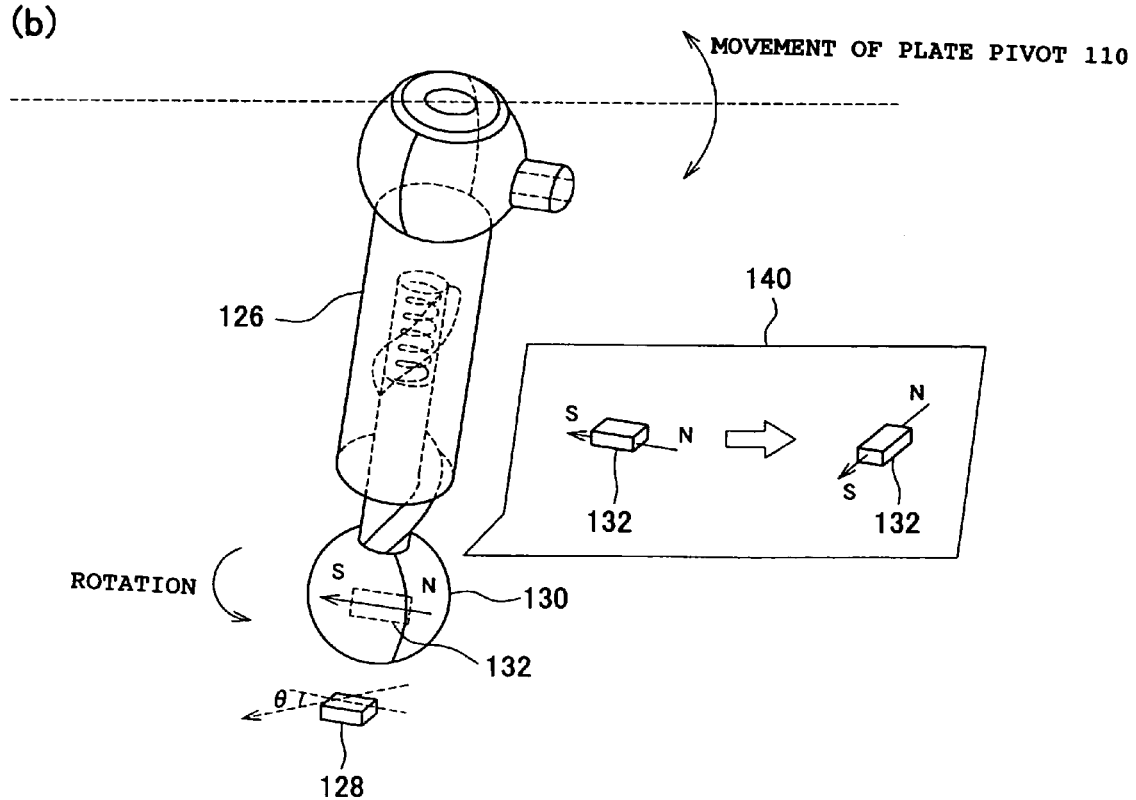

FIG. 5
(a)
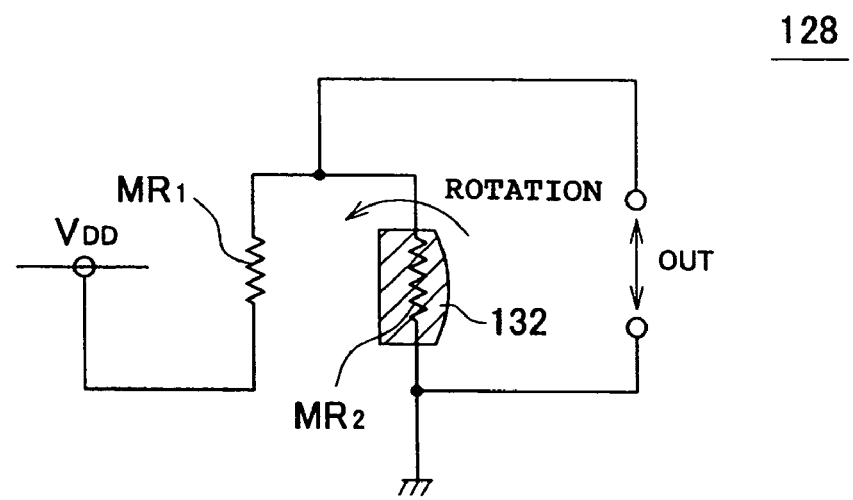
(b)
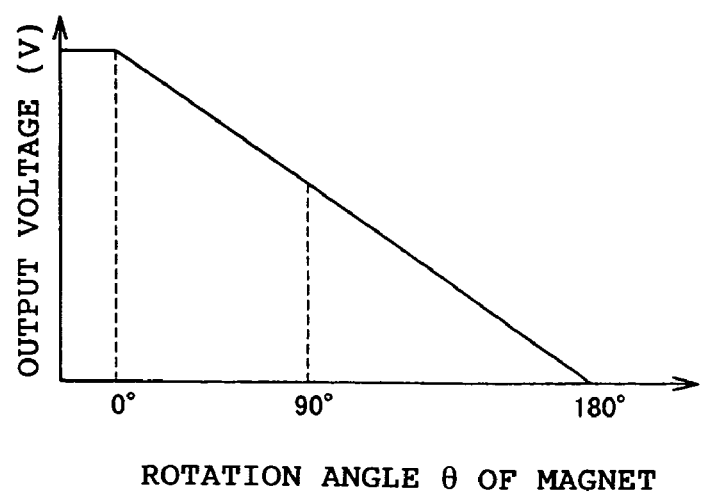

FIG. 6
(a)
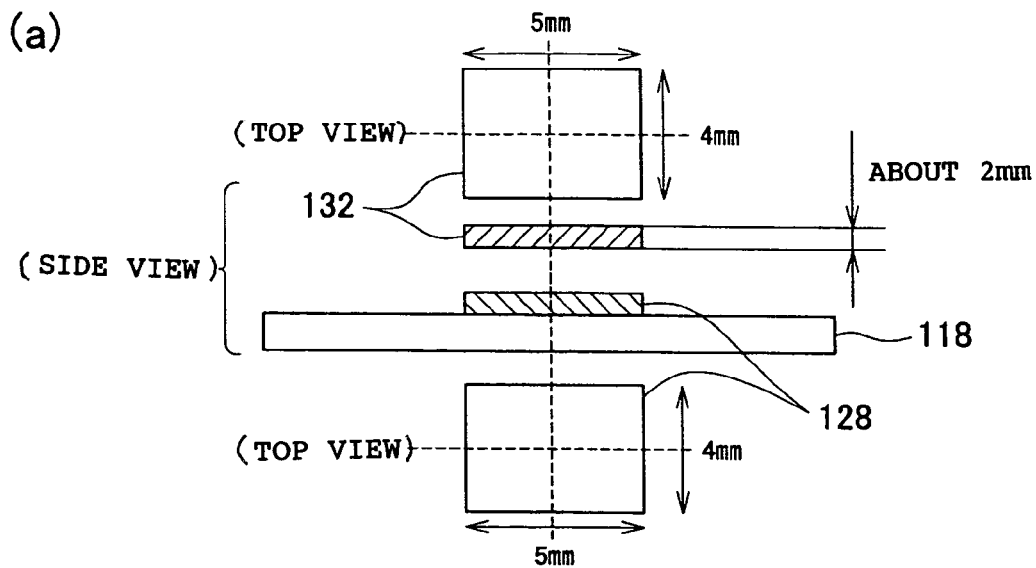
(b)
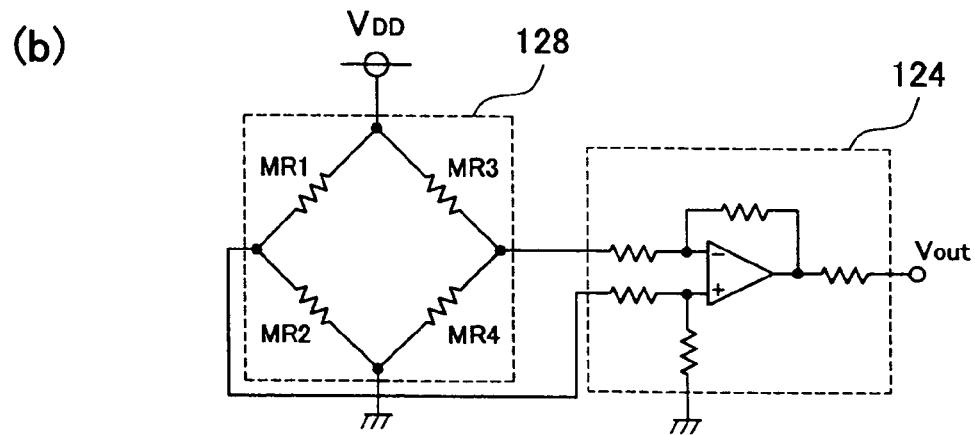
(c)
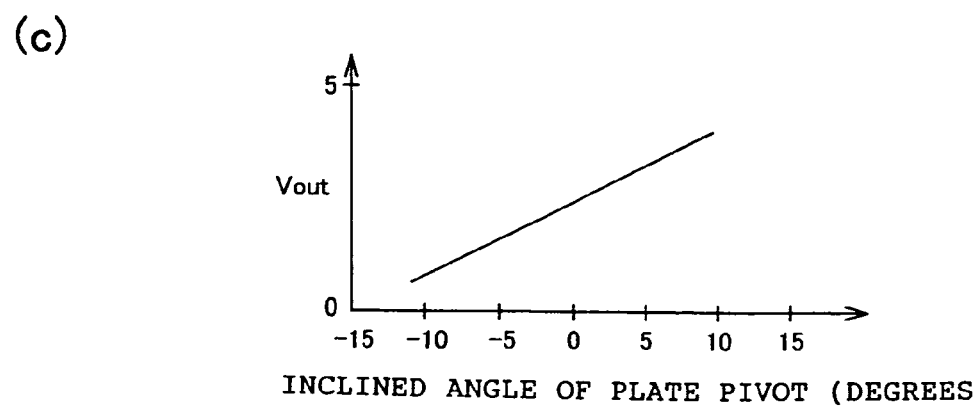

FIG. 8
(a)
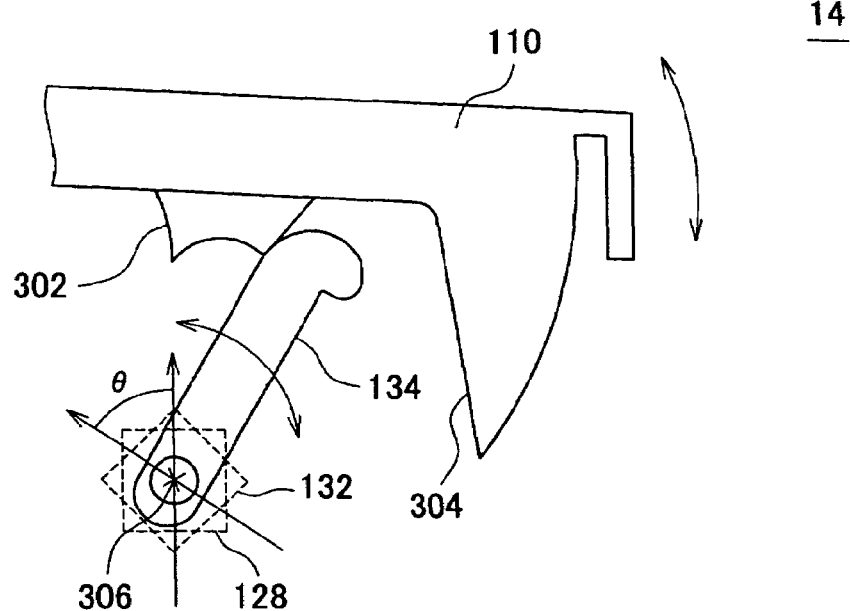
(b)
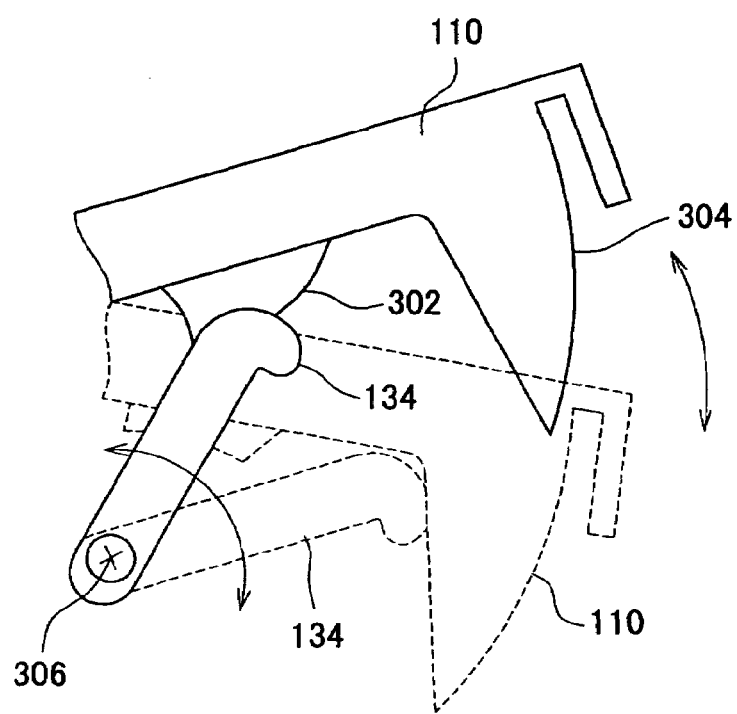

MIRROR AND ANGLE DETECTION DEVICE

CROSS REFERENCE TO RELATED

The present application claims priority under 35 U.S.C. § 119 of Japanese Patent Application No. 2004-283435, filed on Sep. 29, 2004, entitled "MIRROR AND ANGLE DETECTION DEVICE". The contents of that application are incorporated herein by reference in their entirety.

BACKGROUND OF THE INVENTION

1. Field of the Invention

The present invention relates to a mirror and an angle detection device. More specifically, the present invention relates to an outer mirror for vehicles, and an angle detection device for detecting an inclined angle of a mirror surface of the outer mirror.

2. Description of the Related Art

A known model of mirror angle detection devices is one having a structure that a magnet is attached on a plate pivot (or pivot table) in mirror assembly, and that a magnetic sensing device is provided in angle changing assembly (see Japanese Utility Model Application, Laid-Open No. 3-112441 U). This magnetic sensing device senses the variation in a magnetic field which depends on the inclination of a mirror surface.

In this model, in order for the magnet attached on the plate pivot to detect the angle of the mirror surface which changes widely, the magnet needs to be enlarged in proportion to the range of angle of the plate pivot. In addition, to sense the variation in the magnetic field precisely, the pivot point of the plate pivot, the center of the magnet, and the neutral of the magnetic sensing element are necessary to be aligned with one another. This alignment decreases the flexibility in arranging individual components, so that the efficient use of the space inside a mirror angle detection device is inhibited.

Taking the above disadvantages into account, the present invention has been conceived. An object of the present invention is to provide a mirror and an angle detection device that are both capable of overcoming the above disadvantages.

SUMMARY OF THE INVENTION (First Structure)

According to an aspect of a first structure of the present invention, there is provided, a mirror for a vehicle including:

(a1) a mirror surface;

(a2) an actuator for swiveling the mirror surface;

(a3) at least one magnet for changing its orientation by an angle in accordance with a variation in an inclined angle of the mirror surface when the actuator swivels the mirror surface; and (a4) at least one signal output unit for outputting a signal in accordance with the inclined angle of the mirror surface, based on the orientation of the magnet.

In this structure, the magnet is attached to, for example, a mechanism for converting the swiveling movement of the mirror surface into the rotational movement. This makes it possible to detect the inclined angle of the mirror surface precisely. Furthermore, since the position where the magnet is placed is not limited to a specific one, the magnet can be located in any available space within the actuator. Therefore, spaces in the actuator can be used efficiently, compared to the structure that the magnet is secured to the plate pivot directly. Moreover, the structure for detecting the inclined angle of the mirror surface may be incorporated into the actuator so that the structure is made compact.

The mirror can be applied to, for example, an outer mirror for vehicles. The magnet may be a permanent magnet or an electromagnet. The position of the magnet is not limited, and it may be either of the inside or outside of the actuator. The magnet may be placed on a component of the mirror, such as the mirror surface, a mirror holder, the plate pivot or a housing.

(Second Structure)

According to an aspect of a second structure of the present invention, there is provided, the mirror of the first structure further including at least one MR element being positioned such that a current, of which amount changes in accordance with the orientation of the magnet, flows in the MR element. In addition, the signal output unit outputs the signal, based on the current flowing in the MR element. Thus, the MR element outputs an electrical signal indicating the inclined angle of the mirror surface by changing the level of the signal, based on the rotational angle of the magnet.

If being used to detect the magnetic field from the magnet, then a magnetic detection device such as a hall element or hall IC needs to be placed close to the magnet, due to its small sensing area. This may increase failures upon assembly due to manufacturing tolerances. Moreover, the magnet needs to be placed while its N and S poles are oriented toward respective predetermined directions. This may also increase failures, that is, deteriorate the productivity. In addition, the magnet needs to be typically an expensive rare earth permanent magnet, thereby increasing the cost. In contrast, use of the MR element makes it possible to miniaturize the magnet to almost the same size as the MR element. This enables the miniaturization of the magnet, compared to the case of using a magnetic detection device such as a hall element or hall IC.

Furthermore, since the MR element is more sensitive than a magnetic detection device, the MR element can detect a wider range of a magnetic field than the magnetic detection device does. Hence, manufacturing tolerances are smoothed out. In addition, positioning of the S and N poles is unnecessary, thus contributing to the decrease in the assembly failures. Consequently, it is possible to enhance the productivity, and to use not a rare earth permanent magnet but a less expensive magnet.

In this structure, the position of the MR element is not limited, and it may be either of the inside or outside of the actuator. The MR element may be positioned on the component of the mirror such as the mirror surface, a mirror holder, the plate pivot or a housing.

(Third Structure)

According to an aspect of a third structure of the present invention, there is provided, the mirror of the first or second structure in which the magnet changes its orientation by at most 180 degrees over a range where the mirror surface swivels. This makes it possible to detect the inclined angle of the mirror surface by making full use of the detection range of the MR element.

(Fourth Structure)

According to an aspect of a fourth structure of the present invention, there is provided, the mirror of one of the first to third structures further including:

(b1) an interlocking member for changing its orientation in conjunction with the mirror surface, so that the orientation of the interlocking member is aligned with that of the mirror surface;

(b2) at least one slide block being urged toward the interlocking member, and moving in a direction substantially perpendicular to the mirror surface by a distance in accordance with the variation in the inclined angle when the inclined angle of the mirror surface changes; and (b3) at least one turning member rotates by an angle in accordance with a moving distance of the slide block, when the slide block moves.

In this mechanism, the magnet is secured to the turning member and rotates in relation to the rotation of the turning member.

This structure allows the swiveling movement of the mirror surface to be converted into the rotational movement of the magnet appropriately. Note that the direction substantially perpendicular to the mirror surface refers to a direction perpendicular to the mirror surface when the mirror surface is not inclined. The interlocking member may be either of a passive member or an active member that drives the mirror surface. In this case, an example of the passive member is a mirror holder, and an example of the active member is the plate pivot. Alternatively, the interlocking member may be a part of the mirror surface.

(Fifth Structure)

According to an aspect of a fifth structure of the present invention, there is provided, the mirror of the fourth structure in which the slide block is supported not to rotate around an axis parallel to the moving direction of the slide block. In addition, the turning member includes a screw portion to be screwed into the slide block on the axis and to rotate on a thread ridge or a thread groove formed in the slide block when the slide block moves in the moving direction, and a turning portion that is secured to the screw portion and that rotates around the axis in conjunction with the screw portion. Furthermore, the magnet is fixed to the turning portion.

In this structure, the slide block and the screw portion are coupled to each other in a screw fashion, so that the swiveling movement of the mirror surface is converted into the rotational movement of the magnet appropriately.

(Sixth Structure)

According to an aspect of a sixth structure of the present invention, there is provided, the mirror of one of the first to third structures further including:

(c1) an interlocking member for changing its orientation in conjunction with the mirror surface so that the orientation of the interlocking member is aligned with that of the mirror surface; and (c2) a lever being capable of swinging on its one end, the lever having the other end being urged toward the interlocking member, and for swinging by an angle in accordance with the variation in the inclined angle of the mirror surface.

Further, the magnet is fixed to the one end of the lever, and rotates in relation to a swing of the lever.

This structure allows the swiveling movement of the mirror surface to be converted into the rotational movement of the magnet appropriately.

(Seventh Structure)

According to an aspect of a seventh structure of the present invention, there is provided, a mirror for a vehicle including:

(d1) a mirror surface;

(d2) an actuator for swiveling the mirror surface;

(d3) at least one magnet for moving by a distance in accordance with a variation in an inclined angle of the mirror surface when the actuator swivels the mirror surface;

(d4) at least one MR element for detecting a movement of the magnet; and (d5) at least one signal output unit for outputting a signal in accordance with the inclined angle of the mirror surface, based on an output of the MR element.

In this structure, use of the MR element allows the magnet to be made compact. In addition, the MR element can sense a wide range of a magnetic field, thus smoothing out manufacturing tolerances. The N and S poles of the magnet are not required to be oriented to predetermined directions, thereby contributing to the decrease in failures upon assembling. As a result, the productivity is enhanced.

(Eighth Structure)

According to an aspect of an eighth structure of the present invention, there is provided, an angle detection device for detecting an inclined angle of a mirror surface of a mirror for a vehicle, the device including:

(e1) at least one magnet for changing its orientation by an angle in accordance with a variation in the inclined angle of the mirror surface, when the actuator swivels the mirror surface; and (e2) at least one signal output unit for outputting a signal in accordance with the inclined angle of the mirror surface, based on the orientation of the magnet.

This structure achieves the effect similar to the first structure.

(Ninth Structure)

According to an aspect of a ninth structure of the present invention, there is provided, an angle detection device for detecting an inclined angle of a mirror surface of a mirror for a vehicle, the device including:

(f1) at least one magnet for moving by a distance in accordance with a variation in the inclined angle of the mirror surface, when the actuator swivels the mirror surface;

(f2) at least one MR element for detecting a movement of the magnet; and (f3) a signal output unit for outputting a signal in accordance with an inclined angle of the mirror surface, based on an output of the MR element.

This structure achieves the effect similar to the first structure.

In conclusion, with the mirror and angle detection device of the present invention, the inclined angle of the mirror surface can be detected precisely.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 3 is a view depicting a detail structure of a slide block 126 and a turning member 130 according to the first embodiment;

FIG. 4A is a view showing the motion of the turning member 130 in relation to the swivel movement of a plate pivot 110;

FIG. 4B is a view showing the motion of the magnet 132 in relation to the rotation of the turning member 130;

FIG. 5A is a view depicting an example of a circuit in an MR element 128;

FIG. 5B is a view depicting an example of output characteristics of the MR element 128;

FIG. 6A is a view depicting an example of arrangement of the magnet 132, the MR element 128, and a signal output unit 124.

FIG. 6B is a view depicting an example of individual circuits of the MR element 128 and the signal output unit 124;

FIG. 6C is a view depicting an example of output characteristics of the signal output unit 124;

FIG. 8A is a view depicting an arrangement of the mirror angle adjusting device 14 according to a second embodiment of the present invention; and FIG. 8B is a view showing the motion of a lever 134 in relation to the swiveling movement of the plate pivot 110.

DETAILED DESCRIPTION OF THE EXEMPLARY EMBODIMENTS OF THE INVENTION

Figure 1:
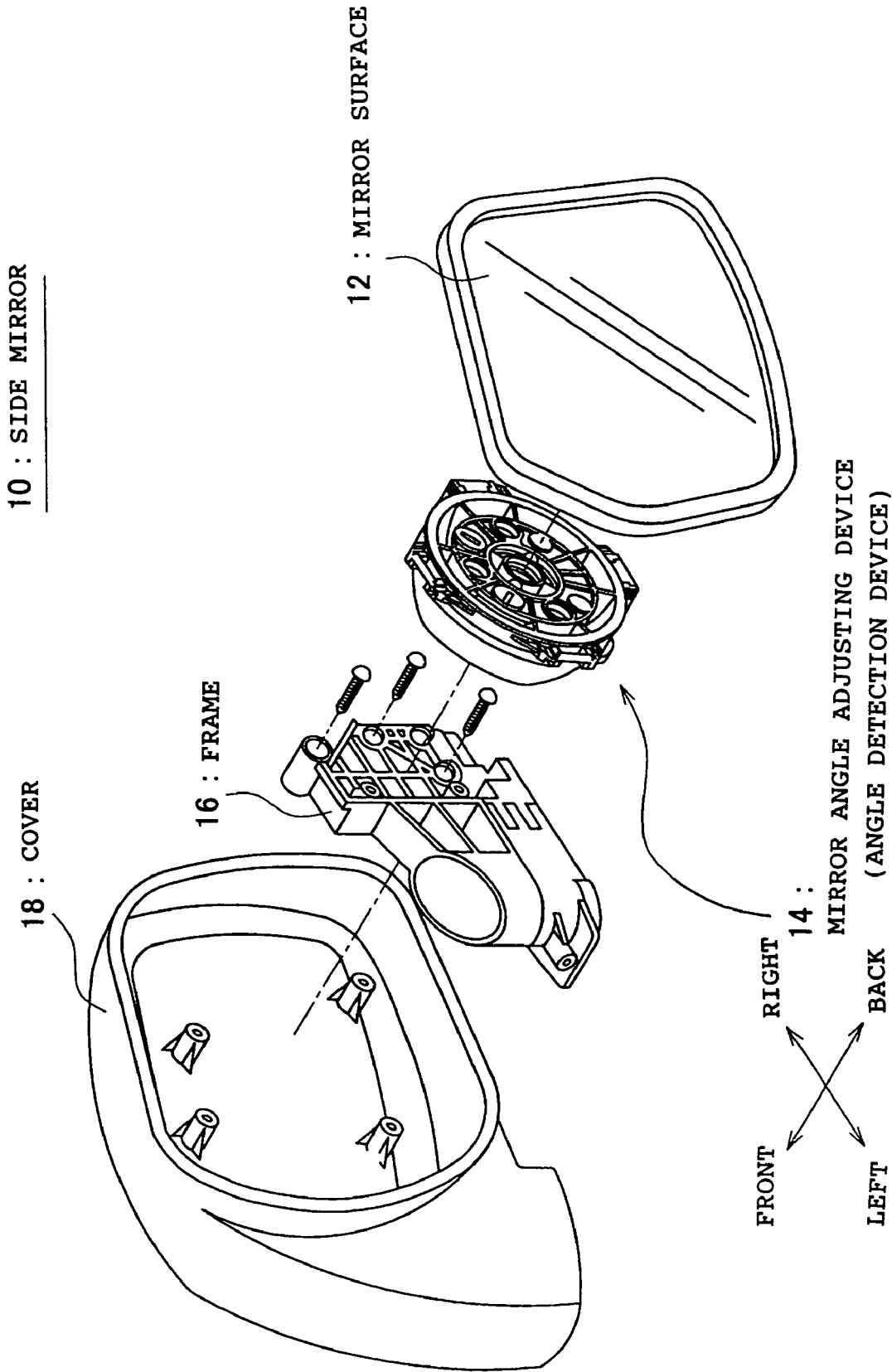
FIG. 1 is an exploded perspective view depicting a side mirror 10 according to one embodiment of the present invention.

A detail description will be given below, of a side mirror of a first embodiment of the present invention, with reference to FIGS. 1 to 7. Referring to FIG. 1, a side mirror 10 is one example of an outer mirror for vehicles such as automobiles, and it includes a cover 18, a mirror surface 12, a frame 16, and a mirror angle adjusting device 14.

The cover 18 serves as a mirror body of the side mirror 10, and it contains the frame 16 and the mirror angle adjusting device 14. The cover 18 has an opening facing toward the rear of a vehicle when the side mirror 10 is attached. In addition, the cover 18 supports the mirror surface 12 within the opening in such a way that the orientation of the mirror surface 12 is variable. Also, the mirror surface 12 is attached facing toward the rear.

The frame 16 is a base fixed within the cover 18, and it retains the mirror angle adjusting device 14 so as to face the back of the mirror surface 12. Note that the back of the mirror surface 12 refers to the surface opposite to the reflecting face of the mirror surface 12.

The mirror angle adjusting device 14 serves as a drive unit for changing the orientation of the mirror surface 12. In this embodiment, the mirror angle adjusting device 14 also has a function of an angle detection device that detects the inclined angle of the mirror surface 12. Further, the mirror angle adjusting device 14 changes the orientation of the mirror surface 12 in such a way that the detected value matches with a pre-stored value. In this way, the inclined angle of the mirror surface 12 is adjusted. Consequently, the side mirror 10 functions as a memory mirror capable of changing its orientation so as to be suitable for a pre-stored viewing point of a driver.

Figure 2:
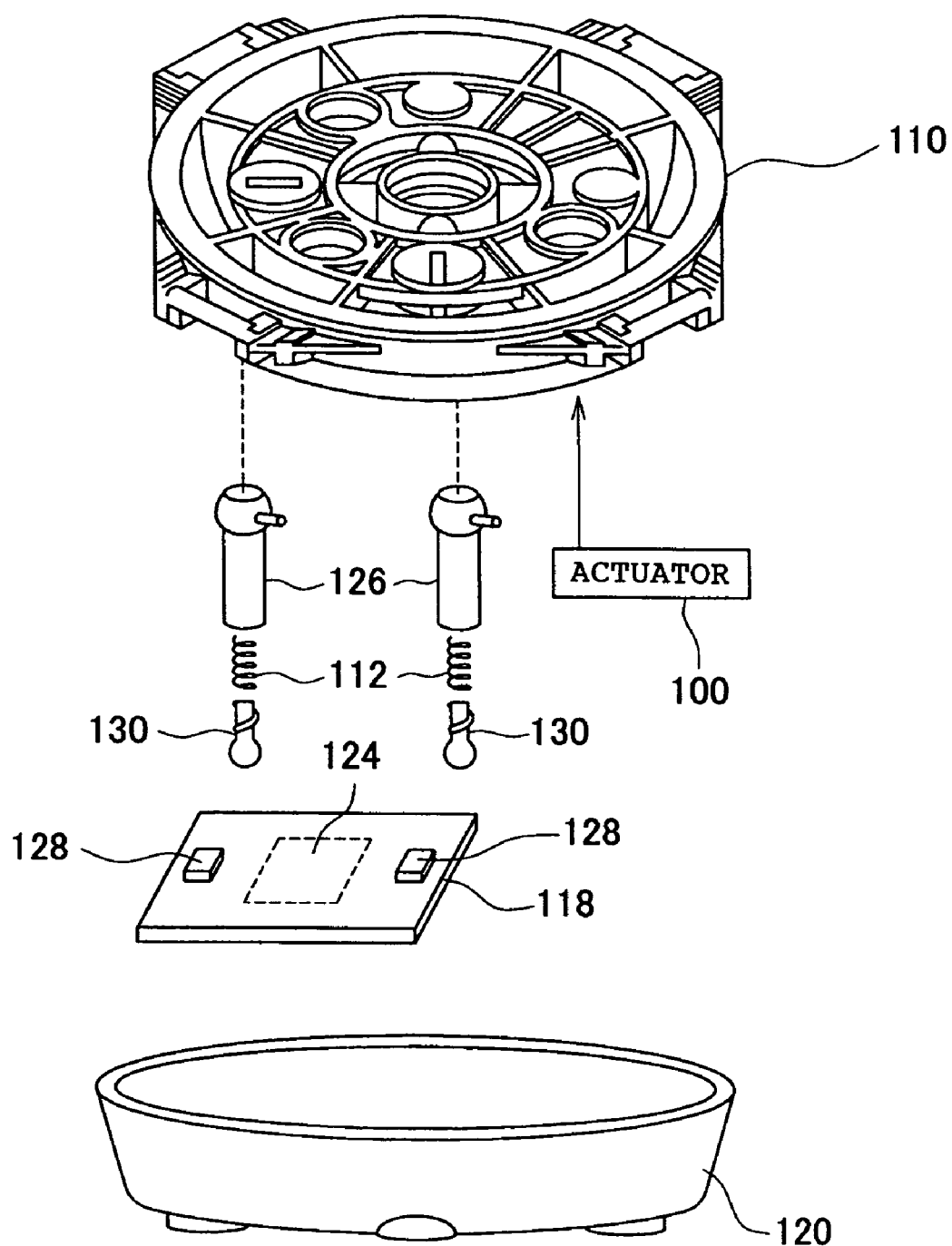
FIG. 2 is an exploded perspective view depicting a mirror angle adjusting device 14 according to a first embodiment of the present invention.

Referring to FIG. 2, the mirror angle adjusting device 14 includes a plate pivot 110, a housing 120, an actuator 100, two slide blocks 126, two springs 112, two turning members 130, and a board 118.

The plate pivot 110 has a plate shape and it is inclined by the power of the actuator 100. Furthermore, the plate pivot 110 supports the back of the mirror surface 12 (see FIG. 1) so as to be substantially parallel to each other. Therefore, the mirror surface 12 is inclined together with the plate pivot 110. In this embodiment, the plate pivot 110 serves as an actively interlocking member. In other words, it works to drive the mirror surface 12. The housing 120 is a case for the mirror angle adjusting device 14. The actuator 100, the slide blocks 126, the springs 112, the turning members 130, and the board 118 are contained in a space formed by the plate pivot 110 and the housing 120.

The actuator 100 swivels the plate pivot 110 around both horizontal and vertical axes. In this embodiment, the horizontal axis represents a predetermined straight line extending parallel to the mirror surface 12 and passing through the center of the plate pivot 110. The vertical axis represents a predetermined straight line extending parallel to the mirror surface 12 and passing through the center of the plate pivot 110. In addition, the horizontal and vertical axes are perpendicular to each other.

Each of the slide blocks 126 has a cylindrical shape, and extends in a direction substantially perpendicular to the mirror surface 12. Further, the slide blocks 126 are urged toward the plate pivot 110 by the springs 112. When the mirror surface 12 swivels around one axis, the plate pivot 110 is inclined. This causes the corresponding one of the slide blocks 126 to move in a direction substantially perpendicular to the mirror surface 12 by a distance in accordance with the swiveling amount of the mirror surface 12. Moreover, in the interior of the slide block 126, is formed a groove into which the turning member 130 is to be screwed.

In this embodiment, one of the slide blocks 126 moves when the plate pivot 110 swivels around the horizontal axis, and the other moves upon swiveling around the vertical axis.

The springs 112 are accommodated into the slide blocks 126, and urge them toward the plate pivot 110, respectively. In addition, the springs 112 urge the corresponding turning members 130 away from the plate pivot 110. The turning members 130 are screwed into the slide blocks 126 while being urged by the springs 112, respectively. Furthermore, each of the turning members 130 has a magnet within.

The board 118 has an electronic circuit thereon. In this embodiment, multiple magneto-resistive (MR) elements 128 and signal output units 124 are mounted on the board 118. The MR elements 128 sense the directions of the magnetic fields from the magnets of the turning members 130, respectively. The signal output units 124 output, to the external of the side mirror 10 (see FIG. 1), electrical signals (or voltages) in accordance with the directions of the magnetic fields, respectively. The magnitudes of these signals depend on the inclined angle of the mirror surface 12.

Referring to FIG. 3, the slide block 126 has a thread groove 208 in its interior. This groove 208 is a thread cutting into which the turning member 130 is to be screwed. The slide block 126 extends in its moving direction.

The turning member 130 has a screw portion 202 and a turning portion 210. The screw portion 202 has a bar shape, and it is to be accommodated into the slide block 126. The screw portion 202 has a thread ridge 206 on its side. The thread ridge 206 is screwed into the thread groove 208 of the slide block 126, so that the screw portion 202 is coupled to the slide block 126. In this way, the screw portion 202 is attached to the slide block 126 in parallel to the direction in which the slide block 126 moves.

The turning portion 210 is secured to the end of the screw portion 202 which is farther from the slide block 126. When the screw portion 202 is being inserted into the thread groove 208 of the slide block 126, the turning portion 210 rotates around the central axis of the screw portion 202 in conjunction with the screw portion 202. In addition, the magnet 132 in the turning portion 210 turns in relation to the rotation of the turning portion 210.

Referring to FIG. 4A, the slide block 126 moves in a direction substantially perpendicular to the mirror surface 12

(see FIG. 1), and does not rotate around its central axis. The slide block 126 moves upward or downward in relation to the swiveling of the plate pivot 110.

The turning member 130 is supported in such a way that it does not to move in the same direction as the slide block 126 and that it rotates around the central axis of the slide block 126. Thus, even when the slide block 126 moves, the turning member 130 does not travel. However, the screw portion 202 is tightened or loosened while sliding on the thread groove 208 (see FIG. 3) of the slide block 126. As a result, the turning member 130 rotates around the central axis of the slide block 126. Since being secured to the screw portion 202, the turning portion 210 rotates in conjunction with the screw portion 202. Hence, when the slide block 126 moves, the turning member 130 rotates by an angle in accordance with the moving distance of the slide block 126.

Referring to FIG. 4B, the magnet 132 in the turning member 130 changes its orientation in relation to the rotation of the turning member 130, as shown in a conceptual view 140. In other words, when the actuator 100 (see FIG. 2) swivels the mirror surface 12, the orientation of the magnet 132 changes by an angle in accordance with the swiveling amount of the mirror surface 12.

The MR element 128 is placed to sense the orientation of the magnet 132. For example, the MR element 128 may change its output current in accordance with the orientation of the magnet 132. This enables the output of the MR element 128 to vary depending on the inclined angle of the mirror surface 12. Note that the MR element 128 varies its resistance, depending on an angle between the directions of the magnet and of the current flowing in the element itself. In other words, the MR element 128 changes its output, depending on an angle θ between the element itself and the magnet. It is preferable that the distance between the magnet 132 and the MR element 128 is at most 5 mm. With this distance, the direction of the magnet field can be sensed with stability.

Referring to FIG. 5A, the MR element 128 includes, for example, multiple MR elements MR1 and MR2 connected in series between a voltage source VDD and a ground. In this embodiment, the MR element MR2 is positioned so close to the magnet 132 that its resistance varies in accordance with the direction of the magnetic field generated from the magnet 132. The MR element MR1 is placed farther than the MR elements MR2 from the magnet 132. Hence, the MR element MR1 is less sensitive to the magnetic field of the magnet 132. The MR element 128 outputs a signal (or voltage) equivalent to the potential difference between the MR elements MR1 and MR2. As a result, the MR element 128 outputs the voltage depending on the orientation (angle θ) of the magnet 132.

As shown in FIG. 5B, the output voltage of the MR element 128 corresponds to the angle θ in a one-to-one relationship on the condition that the angle θ changes from 0 to 180 degrees. The relation between the inclined angle of the mirror surface 12 and the rotation angle θ of the magnet 132 is defined by the thread ridge 206 of the turning member 130 and the thread groove 208 of the slide block 126. Thus, it is preferable that the thread ridge 206 and the thread groove 208 are formed such that the rotation angle range of the magnet 132 falls within 180 degrees when the orientation of the mirror surface 12 fully changes. This allows the inclined angle of the mirror surface 12 to be sensed correctly, while making full use of the dynamic range in which the MR element 128 can sense.

Referring to FIG. 6A, by sensing the angle of the magnet 132 by using the MR element 128, the magnet 132 can be miniaturized to the extent that its dimensions are similar to those of the MR element 128. If the MR element 128 of 4 mm×5 mm is used, the dimensions of the magnet 132 may be about 4 mm×5 mm. Moreover, the magnet 132 may be 2 mm thick. To detect the inclined angle of the mirror surface 12 in the side mirror 10 precisely, the dimensions of the magnet 132 are preferably 3 mm to 5 mm per side. The thickness of the magnet may be 1.5 mm to 2.5 mm.

Referring to FIG. 6B, the MR element 128 includes four MR elements MR1 to MR4 that are all arranged to constitute a bridge circuit. This circuit arrangement makes it possible to output a voltage equivalent to the minor variation in the resistance of each MR element, because of the differential voltage principle.

The signal output unit 124 is composed of a differential amplifier circuit having a negative feedback Op Amp. The signal output unit 124 amplifies the differential voltage outputted from the MR element 128 and, then outputs it. In other words, the signal output unit 124 generates a signal, based on the current flowing in the MR element 128 and, then outputs the signal in accordance with the angle of the mirror surface 12. Consequently, it is possible to detect the inclined angle of the mirror surface 12 with precision.

Referring to FIG. 6C, the output of the signal output unit 124 increases linearly when the plate pivot 110 swivels by ±14 degrees.

Figure 7:
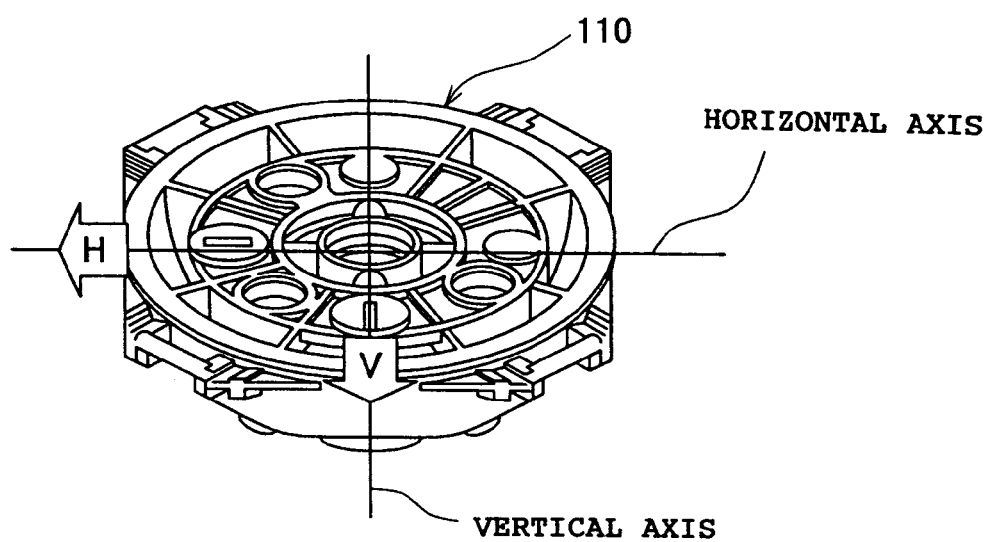
FIG. 7 is a view for explaining a relation of horizontal and vertical axes.

Referring to FIG. 7, as described above, the plate pivot 110 swivels around the vertical and horizontal axes. In order to detect the inclined angle of the mirror surface 12 correctly, the mirror angle adjusting device 14 simply has the slide blocks 126 placed on the vertical and horizontal axes, respectively.

The slide blocks 126 may be located at any positions on the vertical and horizontal axes. Accordingly, the slide blocks 126, the springs 112, the turning members 130, and the MR elements 128 can be arranged in available spaces of the actuator 100. This enables the spaces in the side mirror 10 to be used efficiently.

Next, a description will be given below, of a second embodiment of the present invention with reference to FIGS. 8A and 8B. In FIG. 8, the same reference numerals are given to the same parts as those already described in the first embodiment shown in FIGS. 1 to 7, and duplicate description therefore is omitted. Note that the mirror angle adjusting device 14 of the second embodiment includes the actuator 100 (see FIG. 2) and the board 118 (see FIG. 2), similar to that shown in FIG. 2 to 7.

In this embodiment, the mirror angle adjusting device 14 includes at least one lever 134 as a mechanism for changing the orientation of the magnet 132, instead of the slide blocks 126, the springs 112, and the turning members 130 shown in FIG. 2. The plate pivot 110 has abutment portions 302 and 304 for guiding the movement of the plate pivot 110.

The lever 134 is fixed so as to be capable of swinging on its end 306. The other end of the lever 134 is urged against the plate pivot 110 with, for example, a spring.

Therefore, when the plate pivot 110 swivels, the other end of the lever 134 slides on the back of the plate pivot 110 while pressing the abutment portion 302 or 304. This pressing of the other end allows the lever 134 to rotate around the end 306. Thus, the lever 134 rotates by an angle in accordance with the variation in the inclined angle of the mirror surface 12 (see FIG. 1).

In this embodiment, the magnet 132 is secured to the end 306 of the lever 134 so that the orientation of the magnetic field generated from the magnet 132 is perpendicular to the rotation axis of the lever 134. Accordingly, when the plate pivot 110 swivels, the magnet 132 rotates in conjunction with the lever 134. This makes it possible to the swiveling motion of the mirror surface 12 is converted into the rotation movement of the magnet 132 appropriately.

The MR element 128 is supported not to rotate in conjunction with the lever 134, and it faces the magnet 132. This makes it possible to detect the rotation angle of the magnet 132 correctly, that it, the inclined angle of the mirror surface 12.

From the aforementioned explanation, those skilled in the art ascertain the essential characteristics of the present invention and can make the various modifications and variations to the present invention to adapt it to various usages and conditions without departing from the spirit and scope of the claims. Moreover, it is clear from the claims that such modifications and variations should be included within the scope of the present invention.

What is claimed is:

1. A mirror for a vehicle, comprising:
   a mirror surface;
   an actuator which swivels the mirror surface;
   at least one magnet which changes orientation by an angle in accordance with a variation in an inclined angle of the mirror surface when the actuator swivels the mirror surface;
   at least one signal output unit which outputs a signal in accordance with the inclined angle of the mirror surface, based on the orientation of the magnet;
   an interlocking member which changes an orientation in conjunction with the mirror surface, so that the orientation of the interlocking member is aligned with the orientation of the mirror surface;
   at least one slide block being urged toward the interlocking member, and moving in a direction substantially perpendicular to the mirror surface by a distance in accordance with the variation in the inclined angle when the inclined angle of the mirror surface changes; and
   at least one turning member which rotates by an angle in accordance with a moving distance of the slide block, when the slide block moves,
   wherein the magnet is secured to the turning member and rotates in relation to the rotation of the turning member.

2. The mirror according to claim 1, wherein the slide block is supported not to rotate around an axis parallel to the moving direction of the slide block, the turning member comprises a screw portion to be screwed into the slide block on the axis and to rotate on a thread ridge or a thread groove formed in the slide block when the slide block moves in the moving direction, and a turning portion that is secured to the screw portion and that rotates around the axis in conjunction with the screw portion, and the magnet is fixed to the turning portion.

3. The mirror according to claim 1, further comprising at least one MR element being positioned such that a current, of which amount changes in accordance with the orientation of the magnet, flows in the MR element, wherein the signal output unit outputs the signal in accordance with the inclined angle of the mirror surface, based on the current flowing in the MR element.

4. The mirror according to claim 1, wherein the magnet changes the orientation by at most 180 degrees over a range where the mirror surface swivels.

5. A mirror for a vehicle, comprising:
   a mirror surface;
   an actuator which swivels the mirror surface;
   at least one magnet which moves by a distance in accordance with a variation in an inclined angle of the mirror surface when the actuator swivels the mirror surface;
   at least one MR element which detects a movement of the magnet;
   at least one signal output unit which outputs a signal in accordance with the inclined angle of the mirror surface, based on an output of the MR element;
   an interlocking member which changes an orientation in conjunction with the mirror surface, so that the orientation of the interlocking member is aligned with the orientation of the mirror surface;
   at least one slide block being urged toward the interlocking member, and moving in a direction substantially perpendicular to the mirror surface by a distance in accordance with the variation in the inclined angle when the inclined angle of the mirror surface changes; and
   at least one turning member which rotates by an angle in accordance with a moving distance of the slide block, when the slide block moves,
   wherein the magnet changes the orientation by at most 180 degrees over a range where the mirror surface swivels, and the magnet is secured to the turning member and rotates in relation to the rotation of the turning member.

6. The mirror according to claim 5, wherein the slide block is supported not to rotate around an axis parallel to the moving direction of the slide block, the turning member comprises a screw portion to be screwed into the slide block on the axis and to rotate on a thread ridge or a thread groove formed in the slide block when the slide block moves in the moving direction, and a turning portion that is secured to the screw portion and that rotates around the axis in conjunction with the screw portion, and the magnet is fixed to the turning portion.

7. An angle detection device for detecting an inclined angle of a mirror surface of a mirror for a vehicle, the device comprising:
   at least one magnet which changes orientation by an angle in accordance with a variation in the inclined angle of the mirror surface, when an actuator swivels the mirror surface;
   at least one signal output unit which outputs a signal in accordance with the inclined angle of the mirror surface, based on the orientation of the magnet;
   an interlocking member which changes an orientation in conjunction with the mirror surface, so that the orientation of the interlocking member is aligned with the orientation of the mirror surface;
   at least one slide block being urged toward the interlocking member, and moving in a direction substantially perpendicular to the mirror surface by a distance in accordance with the variation in the inclined angle when the inclined angle of the mirror surface changes; and
   at least one turning member which rotates by an angle in accordance with a moving distance of the slide block, when the slide block moves,
   wherein the magnet is secured to the turning member and rotates in relation to the rotation of the turning member.

8. The angle detection device according to claim 7, wherein the slide block is supported not to rotate around an axis parallel to the moving direction of the slide block, the turning member comprises a screw portion to be screwed into the slide block on the axis and to rotate on a thread ridge or a thread groove formed in the slide block when the slide block moves in the moving direction, and a turning portion that is secured to the screw portion and that rotates around the axis in conjunction with the screw portion, and the magnet is fixed to the turning portion.

9. The angle detection device according to claim 7, further comprising at least one MR element being positioned such that a current, of which amount changes in accordance with the orientation of the magnet, flows in the MR element, wherein the signal output unit outputs the signal in accordance with the inclined angle of the mirror surface, based on the current flowing in the MR element.

10. The mirror according to claim 7, wherein the magnet changes the orientation by at most 180 degrees over a range where the mirror surface swivels.

11. An angle detection device for detecting an inclined angle of a mirror surface of a mirror for a vehicle, the device comprising:
- at least one magnet which moves by a distance in accordance with a variation in the inclined angle of the mirror surface, when an actuator swivels the mirror surface;
- at least one MR element which detects a movement of the magnet;
- a signal output unit outputs a signal in accordance with an inclined angle of the mirror surface, based on an output of the MR element;
- an interlocking member which changes an orientation in conjunction with the mirror surface, so that the orientation of the interlocking member is aligned with the orientation of the mirror surface;
- at least one slide block being urged toward the interlocking member, and moving in a direction substantially perpendicular to the mirror surface by a distance in accordance with the variation in the inclined angle when the inclined angle of the mirror surface changes; and
- at least one turning member which rotates by an angle in accordance with a moving distance of the slide block, when the slide block moves, wherein the magnet changes the orientation by at most 180 degrees over a range where the mirror surface swivels, and the magnet is secured to the turning member and rotates in relation to the rotation of the turning member.

12. The angle detection device according to claim 11, wherein the slide block is supported not to rotate around an axis parallel to the moving direction of the slide block, the turning member comprises a screw portion to be screwed into the slide block on the axis and to rotate on a thread ridge or a thread groove formed in the slide block when the slide block moves in the moving direction, and a turning portion that is secured to the screw portion and that rotates around the axis in conjunction with the screw portion, and the magnet is fixed to the turning portion.

* * * * *